UNITED STATES PATENT OFFICE.

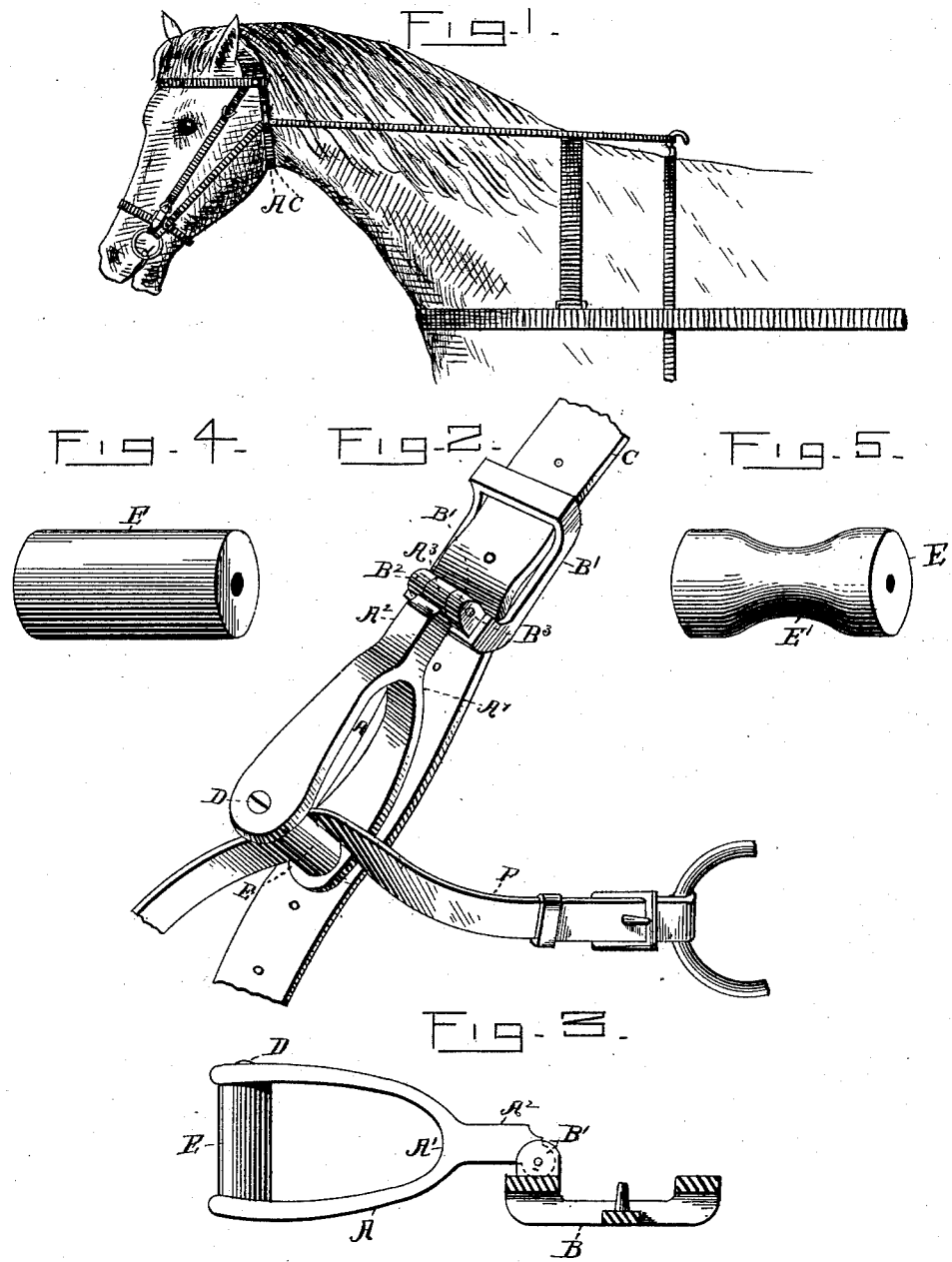

TIMOTHY BARRETT, OF CASCADE, IOWA.

HARNESS-LOOP.

SPECIFICATION forming part of Letters Patent No. 327,060, dated September 29, 1885.

Application filed July 8, 1885. (No model.)

*To all whom it may concern:*

Be it known that I, TIMOTHY BARRETT, a citizen of the United States, residing at Cascade, in the county of Dubuque and State of Iowa, have invented certain new and useful Improvements in Harness-Loops; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in harness-loops, and is intended especially to be secured to the bridle and carry the check-rein.

It consists in certain novel features hereinafter described, and pointed out in the claim.

In the drawings, Figure 1 shows my device in position on a horse. Fig. 2 is a perspective view of my harness-loop and a portion of the check-rein and the throat-latch of the bridle. Fig. 3 is a longitudinal section just inside the frame of the buckle, and Figs. 4 and 5 are detail perspective views of different rollers which may be used.

A is the harness-loop. It is made semi-elliptical, as shown, and its rounded closed end A' is provided with a shank or arm, A², as shown. This shank or arm A² is provided at one corner with a rounded lug, A³. This lug is best shown in dotted lines in Fig. 3.

A buckle, B, is attached to the arm A², to enable the loop to be readily attached to the throat-latch. The buckle is the ordinary harness-buckle, and is provided at one end with two ears, B' B², between which the lug A³ is placed. A pin, B³, is then inserted through an opening formed coincidently in the ears B' B² and the lug A³, thereby forming a hinge-connection between the loop and the buckles, as will be understood. The throat-latch C is placed through the buckle B, as most clearly shown in Fig. 2.

A shaft, D, is held between the ends of the side arms of the loop A and a hollow roller, E, is placed upon the shaft.

The check-rein F is placed through the loop and is supported by the roller E. When the check-rein is a flat strap, I use a straight roller, as shown in Figs. 2, 3, and 4. When the check-rein is a round strap, I use the pulley shown in Fig. 5, with an annular central depression, E'.

The advantages of my device are obvious. The check-rein can easily and readily adapt itself to the motion of the horse's head, and the roller will prevent the wearing away of the strap.

Having thus described my invention, what I claim, and desire to secure by Letters Patent, is—

The combination of a harness-loop made semi-elliptical in form and having a roller held between its side arms at its open end and having its closed end provided with an arm or shank which has a lug formed on one corner, and a buckle provided with two ears or lugs, whereby the buckle and the harness-loop are hinged together, substantially as described and shown.

In testimony whereof I affix my signature in presence of two witnesses.

TIMOTHY BARRETT.

Witnesses:
MICHAEL BARRETT,
JOHN H. KLINKNER.